Sept. 28, 1948.　　　　　S. C. PECKETT　　　　　2,450,157
MEANS FOR PREPARING TRUE SURFACES
Filed Aug. 23, 1946　　　　　　　　　　　　　　5 Sheets-Sheet 1

Inventor.
S. C. Peckett.
by
H. S. Dennison
atty.

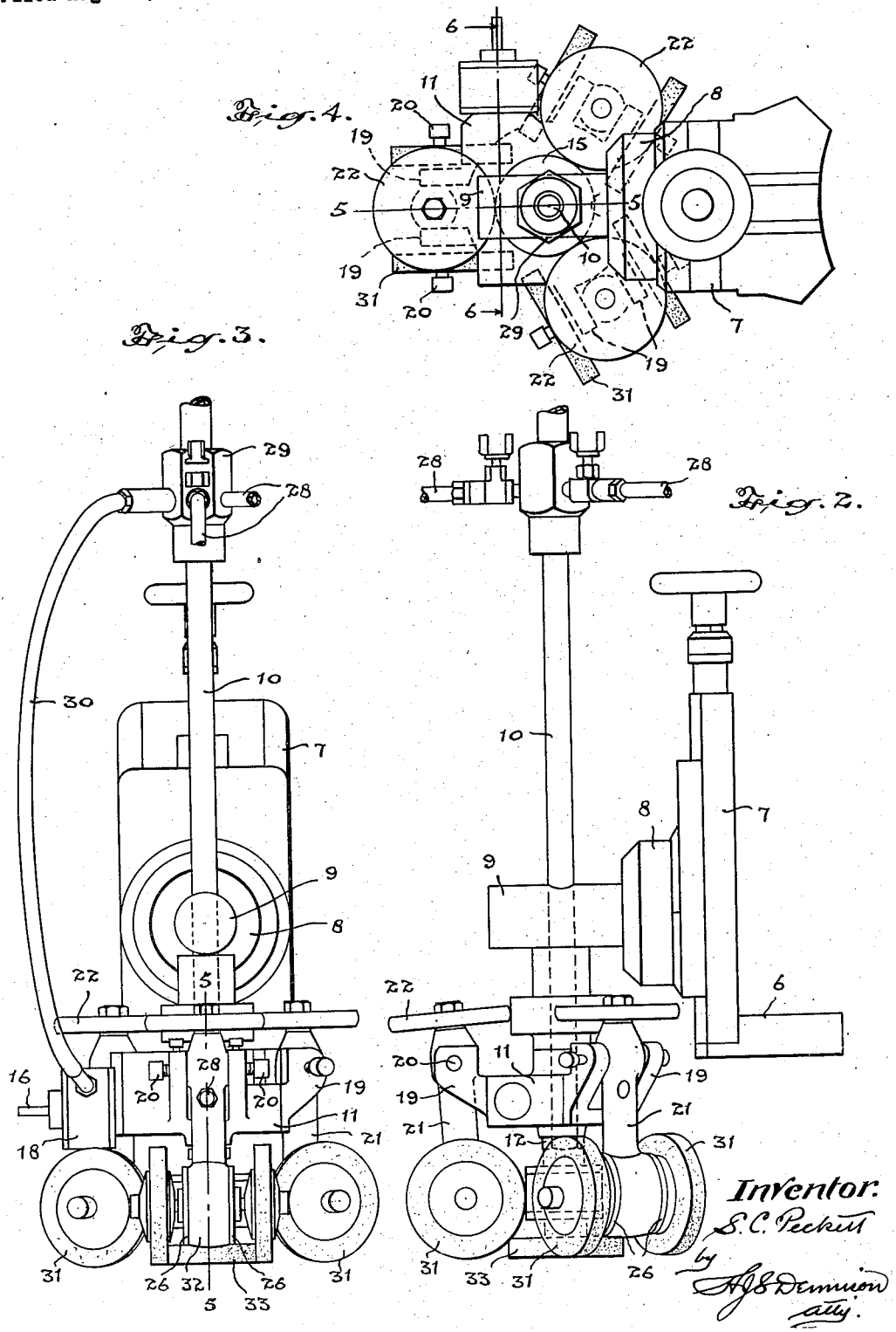

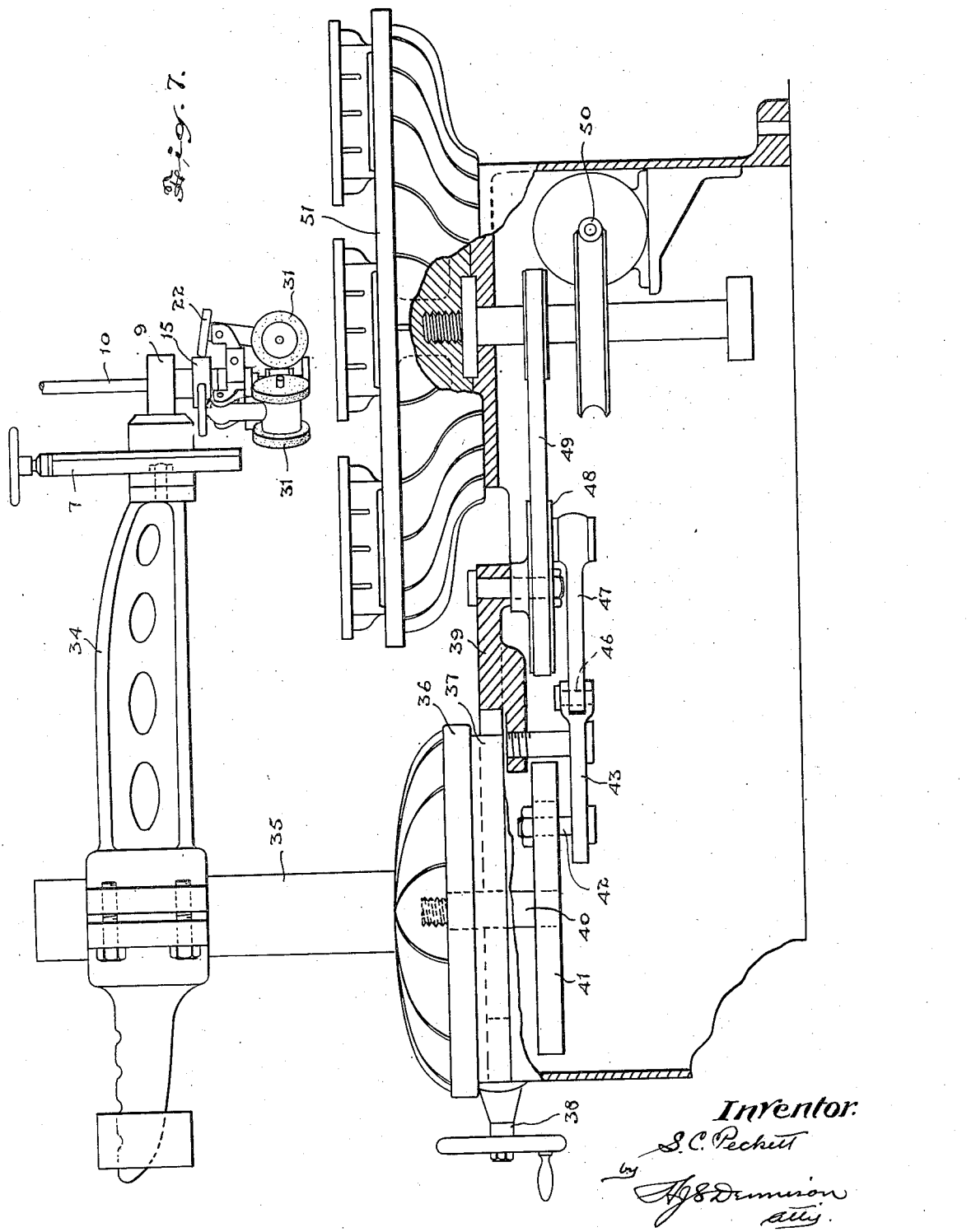

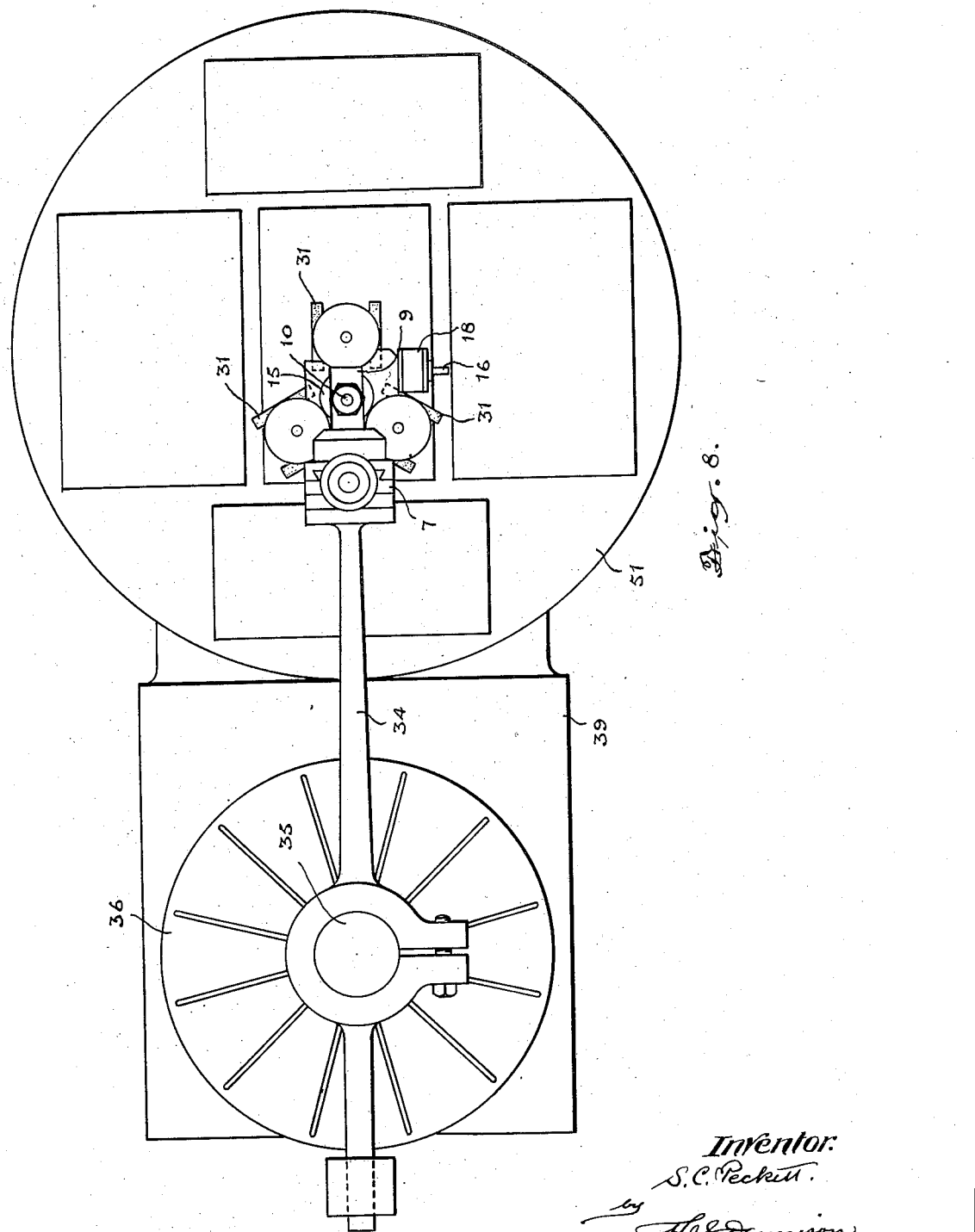

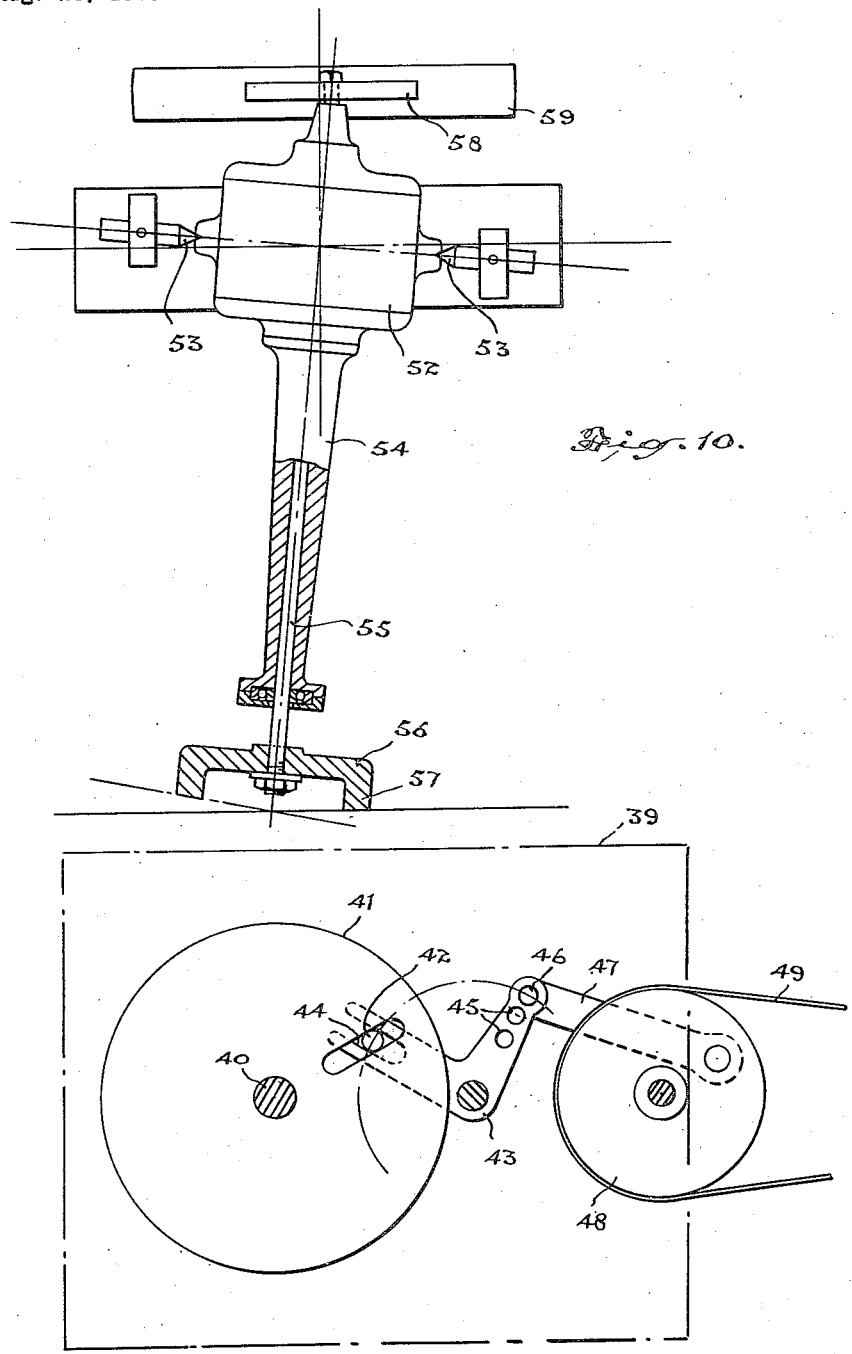

Patented Sept. 28, 1948

2,450,157

UNITED STATES PATENT OFFICE 2,450,157

MEANS FOR PREPARING TRUE SURFACES

Samuel Charles Peckett, Toronto, Ontario, Canada

Application August 23, 1946, Serial No. 692,605

8 Claims. (Cl. 51—33)

In the practice of the machine trade and particularly in the manufacture of tools and fine instruments, surface plates with accurate level surfaces are a very necessary and important part of the mechanic's equipment. The surface of such plates while being accurately level is not microscopically smooth, otherwise straight edges or gauges placed thereon will not slip freely.

Accurate surface plates are quite expensive because of the length of time required to hand-scrape the metal to the accuracy required.

The principal objects of the present invention are to produce accurate surface plates without the necessity of the laborious hand-scraping method, and to devise a method of grinding and provide a machine which will grind true flat surfaces accurately and quickly.

The principal features of the invention consist in manipulating a group of grinding wheels to intermittently contact the surface being prepared while such group of wheels are moved continuously over the surface in various directions, and in providing a machine movably supported upon a master surface plate and extending over a surface to be prepared, said extension carrying a plurality of grinder wheels having relatively angularly disposed axes operated to oscillate on individual pivot supports to bring the wheel surfaces intermittently into and out of contact with the surface being prepared.

In the accompanying drawings

Figure 2 is an enlarged side elevational view of the grinder wheel head.

Figure 3 is a front elevational view of the grinder head shown in Figure 2.

Figure 4 is a plan view of the grinder head shown in Figure 2.

Figure 7 is a side elevational view, partly in section, of a modified form of machine.

Figure 8 is a plan view of the machine shown in Figure 7.

Figure 9 is a detail plan view of a portion of the drive for oscillating the grinder head carrying arm of the machine shown in Figures 7 and 8.

Figure 10 is an elevational detail of a modified form of grinder wheel member.

Figure 1:
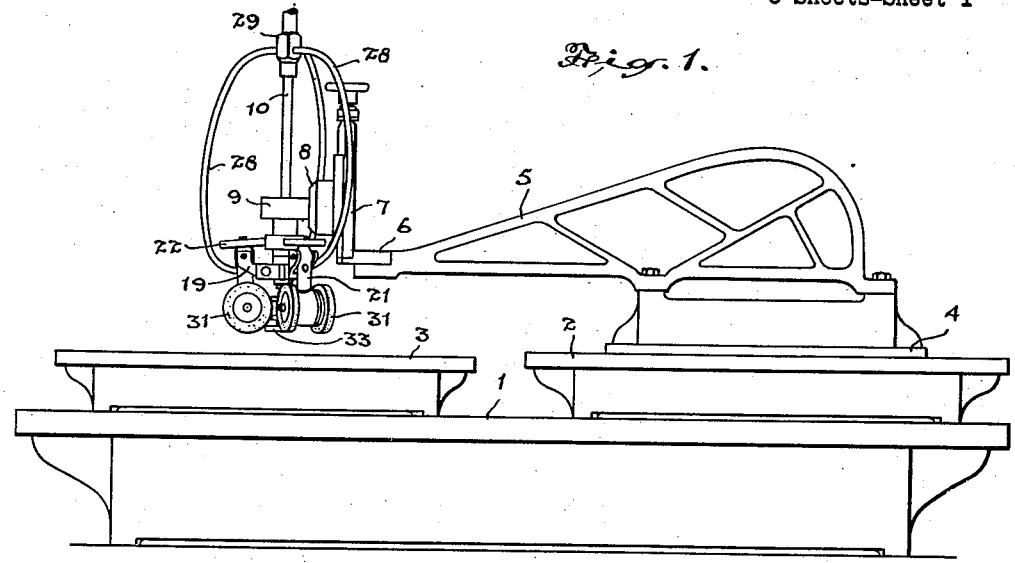
Figure 1 is an elevational view of one form of a surface grinder constructed in accordance with this invention.
Figure 6:
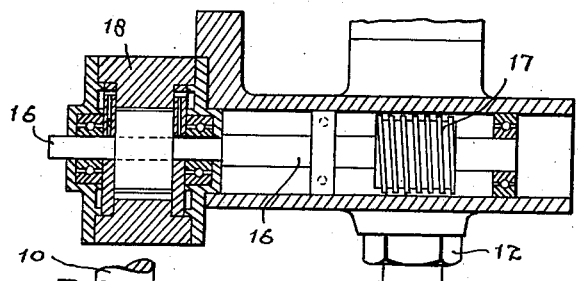
Figure 6 is an enlarged vertical section of the driving mechanism for rotating the grinder wheel head taken on the line 6—6 of Figures 4 and 5.
Figure 5:
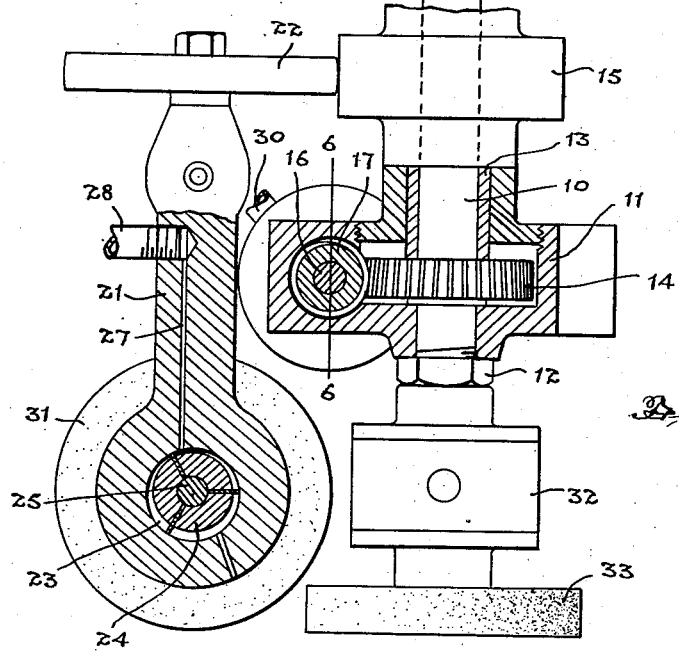
Figure 5 is an enlarged elevation and part vertical section of one of the oscillatable grinder wheel carriers and the driving mechanism for rotating the grinder wheel head, the section being taken on the line 5—5 of Figures 3 and 4.

In the form of the machine illustrated in Figure 1, a level base plate 1 is provided on which is placed a "master" surface plate 2 having a "true" surface and a plate 3, the surface of which is to be trued.

A "true" surface plate 4 is inverted and is slidably supported on the "master" plate 2 and attached to the plate 4 is a rigid arm 5 which extends over the plate 3.

A bracket 6 having a vertical guide 7 is rigidly mounted on the outer end of the arm 5 and supports a vertically adjustable crosshead 8 which has a horizontally projecting stud 9.

Secured in the stud 9 is a vertical rod 10 which extends downwardly below said stud and mounted on the lower end of said rod is a gear box 11 which is held in position by a lock nut 12.

Rotatably mounted on the rod 10 within the gear box is a sleeve 13 secured to or forming part of a worm wheel 14.

A disc 15, the periphery of which is eccentric to the sleeve, is mounted on the upper end thereof.

A shaft 16 is horizontally journalled in said gear box and has mounted thereon a worm 17 meshing with the worm wheel 14 and said shaft is driven by a small compressed air motor 18 mounted on the gear box to rotate the eccentric disc 15 slowly about its axis.

Extending outward and upward from the outer wall of the gear box are a plurality of pairs of lugs 19, three pairs being shown, as seen particularly in Figures 2, 3 and 4.

Between each pair of lugs 19 is pivotally mounted on point bearing screws 20 an arm 21 and on the upper end of each arm is rotatably mounted a roller 22, preferably formed with a cambered surface which engages the eccentric surface of the disc 15. The arms 21 are thus rocked on their pivots as the eccentric disc rotates.

Each of the arms 21 is formed with enlarged lower ends in which is formed a horizontal cylinder 23 in which a small radial vaned rotor 24 is mounted eccentrically on a shaft 25, said shaft being journalled horizontally in bearings in end plates 26 closing the ends of the cylinder.

A compressed air inlet port 27 extends from each cylinder 23 through the arm 21 to a tube connection 28 and the tubes lead to a common air head 29 mounted on the upper end of the rod 10. A similar air tube 30 leads to the air inlet of the motor 18 for driving the eccentric disc worm gear.

Mounted on each end of each of the rotor shafts 25 is a grinder wheel 31.

It will be readily understood that as the eccentric disc 15 slowly rotates in its centralized position between the contact rollers 22 of the pivotal arms 21, said arms will be swung back and forth with an oscillating movement and by adjusting the crosshead 8 in the vertical guide carried by the arm 5 the grinder wheels may be caused to contact the surface of the plate 3, the surface of which is to be trued.

The arm 5 may be moved about, its supporting plate 4 sliding easily upon the surface of the "master" plate 2 and the operator of the machine may manipulate the grinder head with its multiplicity of small grinder wheels to cover every portion of the surface of the plate 3 until it is ground to a "true" surface.

It will also be understood that the swinging movement of the arms 21 will cause the grinder wheels to contact the surface being trued with an arcuate sweeping movement, thereby cutting the surface with curved indents and the operator will manipulate the cutter head to reduce high spots but the surface when completed to a "true" surface will have innumerable minute depressions which will present a surface to tools and instruments used thereon which will allow such tools to slip freely.

In addition to the oscillating grinder wheels I find it desirable to combine therewith a flat grinding surface which will enhance the operation and I show mounted upon the lower end of the rod 10 an air motor 32 which has a vertically arranged shaft, upon the lower end of which is mounted a grinder wheel 33.

The wheel 33 operates centrally between the oscillating wheels and dresses down minute points or ridges which may be formed by the oscillating wheels.

I have found in practice that surface plates of great accuracy can be produced by the use of this machine in a small fraction of the time required in the usual hand scraping operations and a much more desirable operating surface is produced.

In the form of machine illustrated in Figures 7 to 10 I use the same form of grinder head as has been described but instead of the head being carried by an arm mounted on an inverted slidable plate I mount the arm 34 upon a vertical shaft 35 extending upwardly from an inverted surface plate 36 of circular form which may be rotated to swing the arm mechanically.

In the structure shown in Figure 7 the circular plate 36 is mounted on a bed 37 which may be adjusted by a suitable form of screw feed 38, the bed operating in suitable guides in the base or frame 39.

A shaft 40 secured to the rotatable plate 36 extends downwardly and has mounted thereon a disc 41 provided with a stud 42.

A bell crank member 43 pivotally supported from the base 39 is formed with a slotted end 44 which engages the stud and as the bell crank is oscillated on its pivot it rotates the disc 41 a part revolution thus swinging the arm 34.

The other arm of the bell crank 43 is provided with a row of holes 45 in any one of which a crank pin 46 is secured and a connecting rod 47 is mounted on said pin. The other end of said connecting rod is connected to the crank pin of a wheel 48 which is shown driven by a belt 49 from a suitable motor-driven reduction gear 50.

A table 51 is shown rotatably mounted and driven slowly by the said gear 50 and upon this rotary table may be placed a number of surface plates to be surfaced. The plates thus placed will be carried around slowly as the slowly swinging arm 34 swings over same and the grinder wheels of the head carried by said arm will contact the various plates in their rotation.

By the use of this machine the production of accurate surface plates may be speeded up and such plates may be provided at a fraction of the cost of hand finished plates so that industries requiring such plates may be able to greatly extend their use to the general advantage of their production.

In Figure 10 I have shown a slight modification of the grinder wheel support which may be found to be advantageous. In the construction shown a motor casing 52 containing a highspeed rotor is pivotally mounted between pivot point screws 53 set with an axis from approximately 3° to 5° off horizontal.

An arm 54 extends downwardly from the motor casing and carries a shaft 55 which is approximately 3° to 5° off the perpendicular.

Mounted on the end of the shaft is a cupped grinder wheel 56, the edge of the flange 57 of which is bevelled approximately 3° to 5°.

The motor casing is provided with an angularly offset stud on which is mounted a roller 58 to engage an eccentric disc 59 similar to the disc 15 described. A group of several units with angular set wheels may be grouped in a manner similar to the grouping shown in Figures 1 to 4 and hereinbefore described.

It will be understood that the oscillating movement of the arm 54 will bring the bevelled edge of the grinder wheel into contact with the surface to be ground with a circular horizontal sweep and the action on the surface will be to prepare a finish equivalent to "engine turned" patterns produced on metal surfaces.

While I have described the preferred use of a plurality of oscillating grinders grouped about a central eccentric for oscillating same it will be found desirable for certain classes of work to use but one oscillating member and it will be appreciated that the general structure of the apparatus will incorporate the main principle of this invention.

What I claim as my invention is:

1. A means for preparing true surfaces comprising a master true surface, an inverted true surface member slidably mounted on the aforesaid master surface and having a laterally extending arm, a member vertically adjustably supported from said arm, a plurality of members pivotally supported on said vertically adjustable member to swing towards and away from each other in angularly arranged vertical planes, and grinder wheels mounted to rotate on said swingable members.

2. A means for preparing true surfaces comprising a master true surface, an inverted true surface member slidably mounted on the aforesaid master surface and having a laterally extending arm, a member vertically adjustably supported from said arm, a plurality of pivots having their axes arranged transverse to the vertically adjustable member and in angular relation to each other, arms supported from said pivots to swing individually in a plane perpendicular to a surface to be trued, shafts journalled transversely of said swingable arms, individual motors operating said shafts, grinder wheels mounted on the ends of each of said shafts, and means for swinging said arms on their pivots.

3. A device as claimed in claim 2 having a cylinder arranged transversely of the lower end of each of said swingable arms having pressure fluid inlet and exhaust ports, a radial vaned rotor mounted on each shaft eccentrically within each cylinder, flexible tubes leading to said inlet ports, and means for feeding a pressure fluid to said tubes.

4. A device as claimed in claim 2 in which each of said swingable arms is provided with a roller journalled axially of said arm, an eccentric member rotatably mounted on the member supporting said swingable arms and engaging said rollers, and a motor operatively connected to rotate said eccentric member.

5. A device as claimed in claim 2 in which each of said swingable arms is provided with a roller journalled axially of said arm, an eccentric member rotatably mounted on the member supporting said swingable arms and engaging said rollers, a worm wheel connected with said eccentric, a worm operating said worm wheel, and a motor operatively connected to rotate said worm.

6. A device as claimed in claim 2 in which each of said swingable arms is provided with a roller journalled axially of said arm, an eccentric member rotatably mounted on the member supporting said swingable arms and engaging said rollers, a worm wheel mounted co-axial to said eccentric and connected therewith, a worm meshing with said worm wheel and having a laterally extending shaft, a radial vaned rotor mounted on said worm shaft, a cylinder eccentric to said rotor having inlet and exhaust ports, and means conducting a pressure fluid to said latter cylinder.

7. A means for preparing true surfaces comprising a master true surface, an inverted true surface member slidably mounted on the aforesaid master surface and having a laterally extending arm, a vertical crosshead guide mounted on the outer end of said arm, a cross-head adjustably mounted in said vertical guide, a vertical member carried by said crosshead, a gear box mounted on said vertical member, an eccentric rotatably mounted on said vertical member, a reduction gear mounted in said gear box and connected with said eccentric, a motor operating said reduction gear, a plurality of pivot extensions arranged on said gear box, arms pivotally mounted on said pivot extensions to swing in vertical planes, rollers mounted on said arms engaging said eccentric, shafts journalled transversely in the lower ends of said swingable arms, individual motors rotating said shafts, and grinder wheels mounted on the ends of said shafts.

8. A means for preparing true surfaces comprising a master true surface, an inverted true surface member horizontally oscillatable on the aforesaid master surface, an arm extending laterally from said oscillatable member, a plurality of swingable members pivotally suspended from said arm to swing in planes perpendicular to a surface to be trued, grinder wheels mounted to rotate on said swingable members, a motor-driven table rotatably mounted below said extension arm and its swingable grinder wheel carrying members, a pitman wheel operatively connected to said table, a disc connected with said horizontally oscillatable surface member and having an adjustable pin extension, a slotted rocker arm slidably engaging said pin, and a pitman connecting said rocker arm with said pitman wheel to transmit motion from said pitman wheel to effect the oscillation of said horizontally oscillatable member.

SAMUEL CHARLES PECKETT.

REFERENCES CITED

The following references are of record in the file of this patent:

UNITED STATES PATENTS

| Number | Name | Date |
| --- | --- | --- |
| 1,448,239 | Schuessler | Mar. 13, 1923 |
| 1,692,997 | Roberts | Nov. 27, 1928 |
| 1,871,123 | Laabs | Aug. 9, 1932 |
| 2,105,634 | Brendel | Jan. 18, 1938 |
| 2,284,056 | Indge | May 26, 1942 |
| 2,321,441 | Webber | June 8, 1943 |
| 2,378,481 | Hutchings | June 19, 1945 |
| 2,423,826 | Cardone et al. | July 15, 1947 |